United States Patent [19]

Hitomi et al.

[11] Patent Number: 5,396,874
[45] Date of Patent: Mar. 14, 1995

[54] CONTROLLER FOR SUPERCHARGED ENGINE

[75] Inventors: Mitsuo Hitomi; Tadayoshi Kaide; Junsou Sasaki, all of Hiroshima, Japan

[73] Assignee: Mazda Motor Corporation, Hiroshima, Japan

[21] Appl. No.: 46,272

[22] Filed: Apr. 14, 1993

[30] Foreign Application Priority Data

Apr. 14, 1992 [JP] Japan .................. 4-094094

[51] Int. Cl.6 .............................................. F02B 33/44
[52] U.S. Cl. .................. 123/559.1; 123/90.15
[58] Field of Search ............... 123/559.1, 90.15

[56] References Cited

U.S. PATENT DOCUMENTS

| 4,958,606 | 9/1990 | Hitomi et al. | 123/559.1 |
| 5,133,310 | 7/1992 | Hitomi et al. | 123/90.15 |
| 5,161,497 | 11/1992 | Simko et al. | 123/90.15 |
| 5,222,465 | 6/1993 | Sakamoto et al. | 123/90.15 |
| 5,230,320 | 7/1993 | Hitomi et al. | 123/559.1 |

FOREIGN PATENT DOCUMENTS

63-239312 10/1988 Japan .
2-119641 5/1990 Japan .

*Primary Examiner*—Richard A. Bertsch
*Assistant Examiner*—Charles G. Freay
*Attorney, Agent, or Firm*—Keck, Mahin & Cate

[57] ABSTRACT

A controller for a supercharged engine includes a supercharger for supercharging intake air, an intercooler for cooling the intake air discharged from the supercharger, a valve timing varying device for varying valve timing so that an overlapping term, in which both intake and exhaust valves open, is longer when an engine speed is relatively high than when the engine speed is relatively low, and a controller for controlling the valve timing varying device so that when the overlapping term is short at relatively low speed of the engine, the intake valves close at a timing later than a timing at which the intake valves close when the overlapping term is long at relatively high speed of the engine.

11 Claims, 4 Drawing Sheets

FIG. 5

CONTROLLER FOR SUPERCHARGED ENGINE

FIELD OF THE INVENTION

The invention relates to a controller for use with an engine having a supercharger for supercharging intake air and, in particular, to a controller capable of varying an overlapping term in which both intake and exhaust valves of the engine open.

BACKGROUND OF THE INVENTION

A controller for use of an internal combustion engine capable of varying an overlapping term in which both intake and exhaust valves open is conventionally used. For example, Japanese Patent Public Disclosure (Kokai) No. 2-119641 discloses a controller having a mechanical supercharger driven by the engine for supercharging intake air and varying the overlapping term in accordance with driving condition of the engine so that the overlapping term is set to be longer as engine speed is higher. It should be noted that the term "an overlapping term" will be used hereinbelow to mean the term in which both intake and exhaust valves open.

Furthermore, Japanese Patent Public Disclosure (Kokai) No. 63-239312 discloses a controller which controls an engine having a mechanical supercharger so that "the degree of delay" is set to be smaller as the overlapping term is longer, whereby knocking of the engine being avoided. The term "the degree of delay" means the degree indicating how later intake valves close than usual. Hereinafter, the term "the degree of delay" will be used to have such a meaning.

An engine having a supercharger including a turbocharger can decrease density of gas residual in a combustion chamber due to fresh intake air, and consequently decrease a temperature of intake air to decrease a frequency of knocking when the overlapping term is set to be long on the condition that supercharged pressure is higher than pressure of exhaust gas.

When intake valves are closed later than usual, a compression ratio can be substantially decreased. In addition, intake air is compressed by a supercharger, cooled by an intercooler and then provided to the engine, whereby an amount of intake air filled by means of a supercharger can be increased while a compression ratio can be decreased to decrease a temperature of compressed intake air and anti-knocking property can be enhanced.

However, there arise problems when the overlapping term is set to be long and intake valves are made to close later than usual for the purpose of enhancing anti-knocking property. That is, when the overlapping term is set to be long, the overlapping term tends to be longer at low engine speed than at high engine speed, so that so-called "blow-by" is likely to occur. The term "blow-by" means that a part of fuel provided into intake ports passes through a combustion chamber without burning to exhaust ports. In addition, when a piston ascends from BDC, a part of fuel present in a combustion chamber returns through intake valves, which are opening then, to the intake ports. This part of fuel passes to exhaust ports through a combustion chamber without burning when intake valves open next and overlap exhaust valves in opening. Thus, "blow-by" of fuel occurs.

On the other hand, when intake valves are closed later than usual, a load to a supercharger is increased in order to increase supercharging pressure. This arises a problem that a temperature of intake air discharged from a supercharger increases and the temperature tends to reach a critical point in terms of thermal expansion of compression portions in a supercharger.

The present invention is made to solve one or more of aforementioned problems.

SUMMARY OF THE INVENTION

It is an object of the present invention to provide a controller for use of an engine which handles above-mentioned two concepts about enhancement of anti-knocking property in accordance with driving conditions of the engine, whereby anti-knocking property can be enhanced without occurrences of "blow-by" of fuel and increase of temperature of discharged intake air to its critical point.

The invention provides a controller for a supercharged engine including a supercharger for supercharging intake air, an intercooler for cooling the intake air discharged from the supercharger, valve timing varying device for varying valve timing so that an overlapping term in which both intake and exhaust valves open is longer when an engine speed is relatively high than when the engine speed is relatively low, and a control device for controlling the valve timing varying device so that when the overlapping term is relatively short at relatively low speed of the engine, the intake valves close at a timing later than a timing at which the intake valves close when the overlapping term is relatively long at relatively high speed of the engine.

In brief, in the present invention, when the engine speed is relatively low, the overlapping term is set to be relatively short and the intake valves are closed later than usual, while when the engine speed is relatively high, the overlapping term is set to be relatively long and the intake valves are closed at a timing earlier than that for relatively low engine speed.

In a preferred embodiment, the supercharger is a mechanical supercharger driven by the engine.

In another preferred embodiment, the valve timing varying device is controlled by the control device so as to control the overlapping term at relatively low speed of the engine so that a period of time of a stroke in which a piston descends from TDC is longer than a period of time of a stroke in which the piston ascends to TDC.

In still another preferred embodiment, mask portions are formed towards a combustion chamber to be higher than other portions at least at a part of peripheral edges of openings of at least one of the intake and exhaust valves, whereby when the overlapping term is relatively short, the overlapping term starts with the situation that valve lift of the exhaust valves is lower than the height of the mask portions, while when the overlapping term is relatively long, the overlapping term starts with the situation that valve lift of the exhaust valves is higher than the height of the mask portions.

The advantages obtained by the aforementioned controller in accordance with the invention will be described hereinbelow.

The present invention can prevent the "blow-by" of fuel from occurring since the overlapping term is short when the engine speed is relatively low. Furthermore, the control device controls the valve timing varying device so that intake valves close later than usual resulting with substantial compression ratio of intake air being decreased. In addition, since intake air is provided into an engine after the intake air is compressed by a supercharger and cooled by an intercooler, a compression ratio in the engine can be decreased to thereby decrease a temperature of compressed intake air, so that knocking can be prevented from occurring. It should be noted that, when pressure at supercharging is increased, a load to a supercharger is increased with the result that the temperature of discharged intake air increases as aforementioned, but that the temperature does not reach its critical point since the engine speed is relatively low.

When the engine speed is relatively high, since the overlapping term is long, fresh intake air can decrease density of residual gas in a combustion chamber to thereby decrease the temperature of the intake air with the result that the frequency of knocking can be decreased. The decrease of the density of residual gas in a combustion chamber makes it possible to increase an amount of charged intake air. Consequently, intake air can be charged at low pressure at supercharging and this decreases a load to a supercharger to decrease the temperature of discharged intake air and maintain under the critical point.

In the preferred embodiment, since a mechanical supercharger is used, pressure at supercharging can be stably maintained to be higher than pressure of exhaust gas. In particular when the engine speed is relatively high, such a high pressure at supercharging can scavenge residual gas in a combustion chamber to increase an amount of charged intake air, resulting with enhancement of engine output.

In the another preferred embodiment, when the engine speed is relatively low, a period of time of a stroke in which a piston descends from TDC is longer than a period of time of a stroke in which the piston ascends to TDC in the overlapping term. Accordingly, fuel provided from intake ports is likely to enter a combustion chamber in the stroke in which a piston descends from TDC, so that the "blow-by" of fuel can be decreased.

In the still another preferred embodiment, the mask portions are formed and, when the overlapping term is short, the overlapping term starts with the situation that valve lift of the exhaust valves is lower than the height of the mask portions, while when the overlapping term is long, the overlapping term starts with the situation that valve lift of the exhaust valves is higher than the height of the mask portions. Therefore, the mask portions overlap the intake and exhaust valves during the overlapping term. This prevents "blow-by" from occurring even when the engine speed is relatively low and also enhances anti-knocking property by setting the overlapping term to be long.

The above and other objects and advantageous features of the present invention will be made apparent from the following description made with reference to the accompanying drawings.

DESCRIPTION OF THE PREFERRED EMBODIMENTS

A preferred embodiment in accordance with the invention will be explained hereinbelow with reference to drawings.

Figure 2:
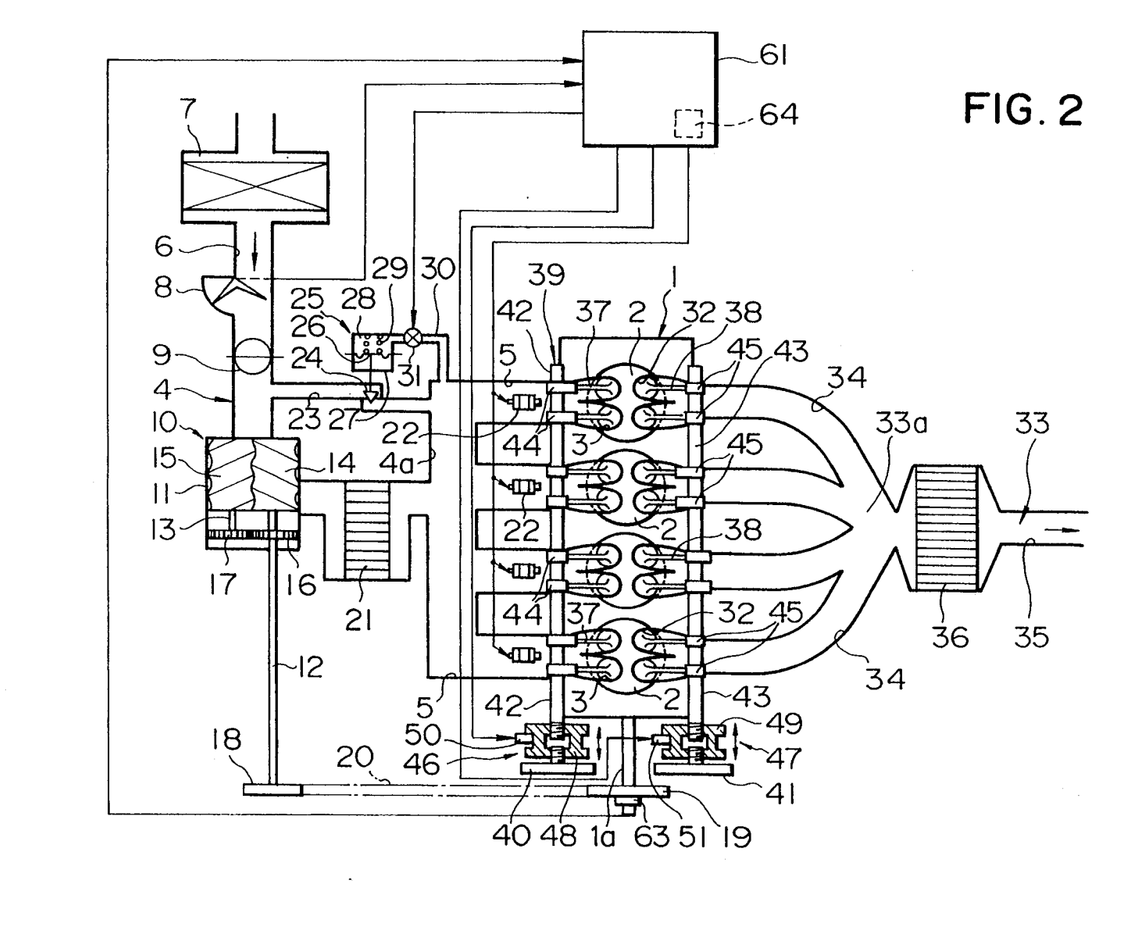
FIG. 2 is a schematic view illustrating the whole structure of the invention.

FIG. 2 illustrates a whole structure of the embodiment in accordance with the invention. An engine 1 is a straight type engine having four cylinders 2 to which two intake ports 3 and two exhaust ports open. The intake ports 3 are opened or closed with intake valves 37 while the exhaust ports 32 are opened or closed with exhaust valves 38. The intake ports 3 are located downstream of an intake air passage 4. This intake air passage 4 comprises four independent intake air passages 5 downstream of which the intake ports 3 are disposed, and one main intake air passage 6 downstream of which is formed a gathering area 4a to which the four independent intake air passages 5 connect at their upstream ends. Upstream of the main intake air passage 6 is disposed an air cleaner 7 for cleaning intake air. In the main intake air passage 6, downstream of the air cleaner 7 are disposed, an air flow meter 8 for measuring an amount of intake air, a throttle valve 9 for restricting openness of the main intake air passage 6, a supercharger 10 for supercharging intake air by compressing the intake air, and an intercooler 21 for cooling air compressed by the supercharger 10 in this order. Fuel injectors 22 are disposed in the vicinity of the each intake ports 3 for injecting fuel into the cylinders 2.

The supercharger 10 is a mechanical supercharger of internal compression type and has male and female rotors 14, 15 in a housing 11 each of which is rotatably supported with shafts 12, 13. Gears 16, 17 are coaxially secured to the shafts 12, 13 and are in mesh. The rotation of the gears 16, 17 causes the shafts 12, 13 to rotate in opposite directions. Secured to the shaft 12 at its one end is a pulley 18 which is operatively connected through a transmissive belt 20 to a pulley 19 secured to a crank shaft 1a of the engine 1. The rotation of the engine 1 causes the rotors 14, 15 to rotate to suck intake air into the housing 11. The intake air is compressed in the supercharger 10 and discharged from the housing 11.

A relief passage 23 is connected at its one end to the gathering area 4a of the intake air passage 4 and at the other end to the main intake air passage 6 downstream of the throttle valve 9 and upstream of the supercharger 10. The relief passage 23 allows a part of intake air discharged from the supercharger 10 to direct to the intake air passage 4 located upstream of the supercharger 10. In the relief passage 23 is disposed a control valve 24 which opens or closes the relief passage 23 to control an amount of relieved intake air and thus control pressure at supercharging to the engine 1. The control valve 24 is connected to and driven by an actuator 25. The actuator 25 has a diaphragm 26 connected to the actuator 25, a pressure chamber 28 defined in a casing 27 by the diaphragm 26, and a spring 29 provided in the pressure chamber 28 for biasing the control valve 24 to close. The pressure chamber 28 is communicated through a passage 30 to the gathering area 4a of the intake air passage 4. The pressure at supercharging is provided through the passage 30 from the supercharger 10 to the gathering area 4a. A duty solenoid valve 31 is disposed in the passage 30 and controls the pressure introduced to the pressure chamber 28 to control the pressure at supercharging. Namely, when the duty solenoid valve 31 is open at great degree, high pressure is introduced to the pressure chamber 28 to open the control valve 24 at small degree resulting with small amount of relieved intake air and thus high pressure at supercharging, while when the duty solenoid valve 31 is open at small degree, low pressure is introduced to the pressure chamber 28 to open the control valve 24 at great degree resulting with great amount of relieved intake air and thus low pressure at supercharging.

The exhaust ports 32 of the each cylinder 2 of the engine 1 is located most upstream of an exhaust passage 33. The exhaust passage 33 comprises four independent exhaust passages 34 upstream of which are disposed-the exhaust ports 32, and one main exhaust passage 35 upstream of which is formed a gathering area 33a to which the four independent exhaust passages 34 are connected. In the main exhaust passage 35 is disposed an exhaust gas cleaner 36 for cleaning exhaust gas.

The engine 1 has a valve driving system 39 for opening or closing the intake and exhaust valves 37, 38 of each cylinder 2. The valve driving system 39 includes an intake cam shaft 42 and an exhaust cam shaft 43 driven to rotate synchronously with the crank shaft 1a of the engine 1 through timing pulleys 40, 41 and a timing belt (not shown). The intake cam shaft 42 is formed with two cams 44 for each cylinders 2 and the exhaust cam shaft 43 is formed with two cams 45 for each cylinders 2. These cams 44, 45 open or close the intake valves 37 and the exhaust valves 38 through tappets (not shown). The valve driving system 39 includes valve timing varying apparatuses 46, 47 disposed between the timing pulleys 40, 41 and the cam shafts 42, 43 for varying an overlapping term of the both intake and exhaust valves 37, 38 by varying opening or closing timing of the intake and exhaust valves 37, 38. As mentioned earlier, the term "an overlapping term" means a term in which both the intake and exhaust valves 37, 38 open. The valve timing varying apparatuses 46, 47 are of the identical structure and has sleeves 48, 49 which are driven by actuators 50, 51 to move longitudinally and thus change the phase between the timing pulleys 40, 41 and the cam shafts 42, 43 by relatively rotating them. The movement of the sleeves 48, 49 to their stroke ends changes opening and closing timings of the intake and exhaust valves 37, 38 to thereby vary the overlapping term of the valves 37, 38. More specifically, in this embodiment, only the intake valve timing varying apparatus 46 is operated to change opening and closing timings of the intake valves 37 to thereby vary the overlapping term. When the sleeve 48 of the intake valve timing varying apparatus 46 is moved to one stroke end, as illustrated with a broken line A in FIG. 1, opening and closing timings of the intake valves 37 are arranged to be optimum timings, which are usually chosen so that charging efficiency of intake air is sufficiently high as viewed overall driving condition of the engine 1, for instance. On the other hand, when the sleeve 48 is moved to the other stroke end, as illustrated with a solid line B in FIG. 1, opening and closing timings of the intake valves 37 are arranged to be later than the earlier mentioned optimum timings.

Figure 1:
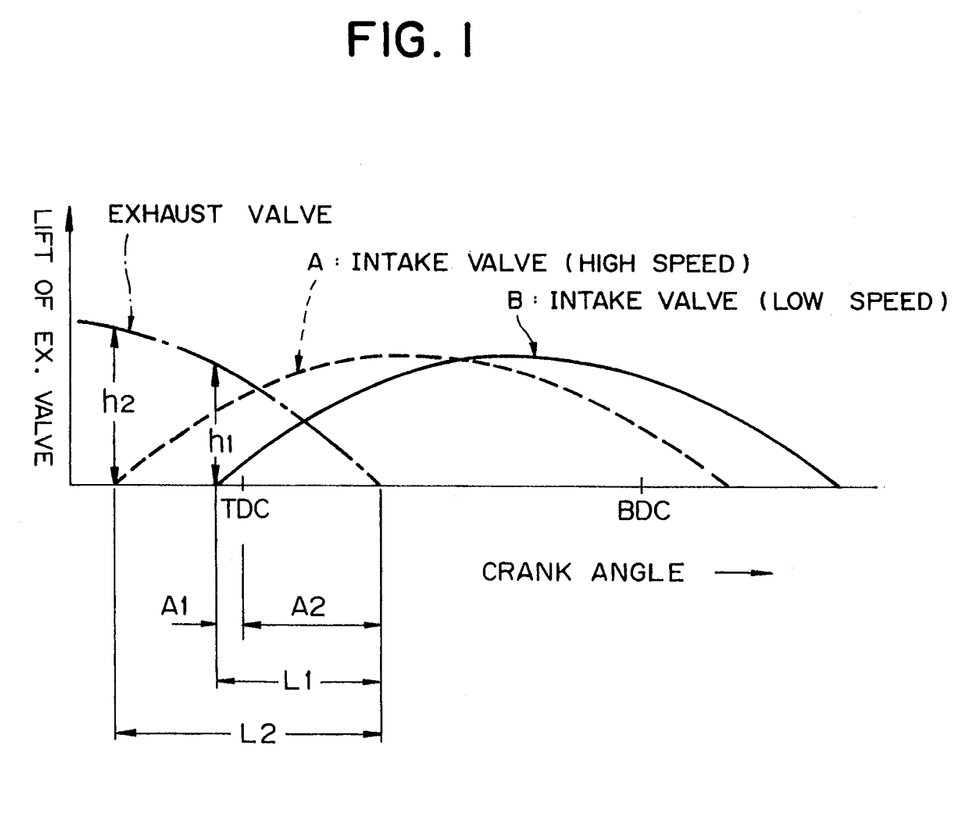
FIG. 1 is a graph illustrating timing at which intake and exhaust valves open or close.

As illustrated in FIG. 1, when the overlapping term is relatively short, that is, the overlapping term is set to be the term L1, a crank angle A1 starting at the intake valves 37 being open and terminating at a piston (not shown) reaching top dead center (TDC) is smaller than a crank angle A2 starting at a piston (not shown) reaching TDC and terminating at the exhaust valves 38 being closed.

Figure 4:
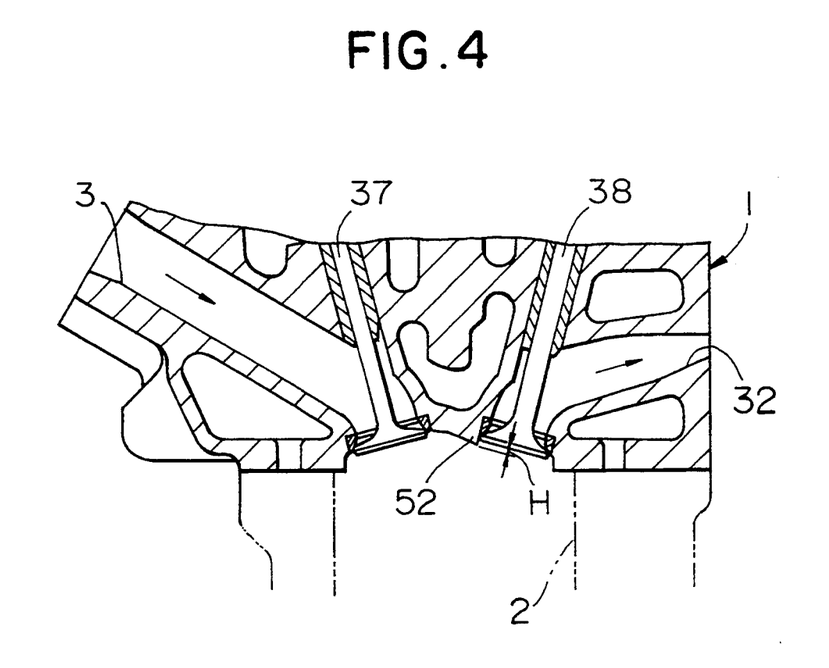
FIG. 4 is a cross-sectional view illustrating the structure around the mask portions.
Figure 5:
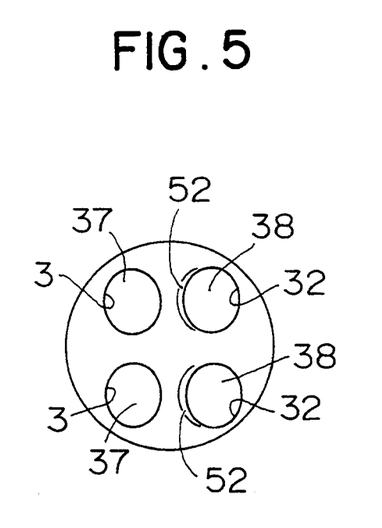
FIG. 5 is a plan view of the mask portions as seen from a combustion chamber.

As illustrated in FIGS. 4 and 5, the exhaust ports 32 are formed at their peripheral edge of openings facing a combustion chamber with mask portions 52 formed towards the intake ports 3 to be higher than other portions. The mask portions 52 have heights H measured in the direction along which the exhaust valves 38 are lifted. The height H is greater than lift height h1 of the exhaust valves 38 at opening timing of the intake valves 37 on the condition that the overlapping term is relatively short, namely the overlapping term is the term L1, but smaller than lift height h2 of the exhaust valves 38 at opening timing of the intake valves 37 on the condition that the overlapping term is relatively long, namely the overlapping term is the term L2 (h1<H<h2). Accordingly, when the overlapping term is relatively short (L1), the overlapping term starts with the situation that the height h2 of the exhaust valves 38 is lower than the height of the mask portions 52, while when the overlapping term is relatively long (L2), the overlapping term starts with the situation that the height h2 of the exhaust valves 38 is taller than the height of the mask portions 52.

A control unit 61 controls the control valve 24, the fuel injectors 24, and the actuators 50, 51 of the valve timing varying apparatuses 46, 47. The control unit 61 receives output signals at least from a sensor 63 for sensing revolutionary speed of the engine 1 based on the rotation of the crank shaft 1a, and from the air flow meter 8.

The control unit 61 has a central processing unit (CPU) for analyzing the aforementioned output signals to determine an amount of fuel to be injected. The control unit 61 transmits a signal indicating such an amount to the injectors 22 and thereby the injectors 22 inject fuel at a determined amount into the cylinders 2.

Figure 3:
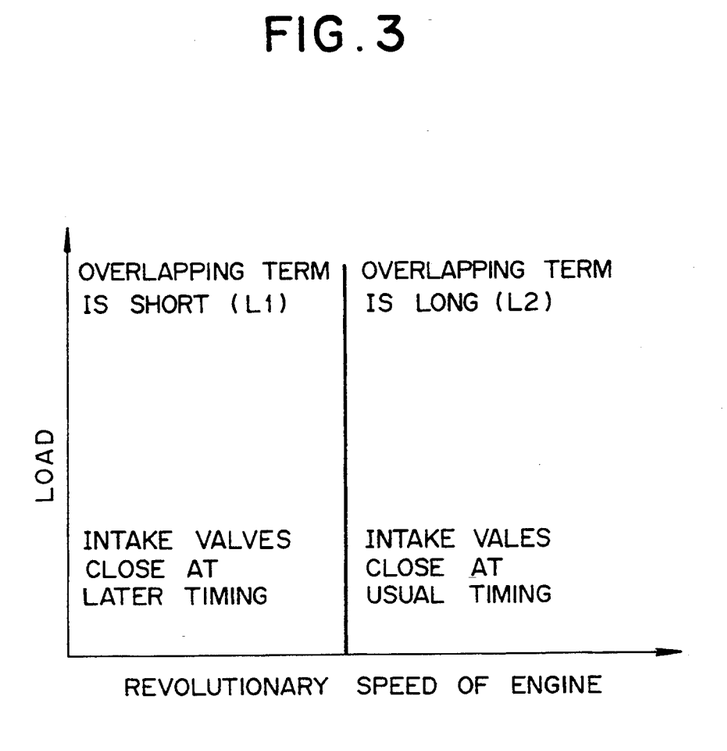
FIG. 3 illustrates how an overlapping term and intake valves' closing timing are set for each area of engine driving.

The control unit 61 has a controller 64 comprising steps of signal processing. The actuator 50 of the intake valve timing varying apparatus 46 is controlled by the controller 64 as follows. At first, the controller 64 determines driving condition of the engine 1 on the basis of the revolutionary speed of the engine and the amount of intake air. As shown in FIG. 3, when the engine 1 is driven at relatively low speed, the sleeve 48 of the intake valve timing varying apparatus 46 is moved the aforementioned other stroke end so that the overlapping term is relatively short, namely the overlapping term is the term L1, and the intake valves 37 are closed later than usual, as illustrated with a solid line B in FIG. 1. On the other hand, when the engine 1 is driven at relatively high speed, the sleeve 48 is moved the aforementioned one stroke end so that the overlapping term is relatively long, namely the overlapping term is the term L2, and the intake valves 37 are closed at usual timing, as illustrated with a broken line A in FIG. 1. Accordingly, the controller 64 controls the actuator 50 of the intake valve timing varying apparatus 46 to set the overlapping term at low speed of the engine 1 so that a period of time of a stroke in which a piston descends from TDC is longer than a period of time of a stroke in which a piston ascends to TDC.

In operation, during the engine 1 is driven, fuel to be injected is determined based on the outputs transmitted from the air flow meter 8 and the engine revolutionary speed sensor 63 and then the determined amount of fuel is injected through the injectors 22 to the cylinders 2.

Simultaneously, the control unit 61 controls the actuator 50 of the intake valve timing varying apparatus 46 to vary opening timing of the intake valves 37 and the overlapping term. Specifically, when the engine speed is relatively low, the actuator 50 receives a control signal to thereby moves the aforementioned other stroke end. Accordingly, the overlapping term is set to be relatively short (L1) as shown with a solid line B in FIG. 1 and the intake valves 37 are to be closed later than usual. Since the overlapping term is set to be relatively short, the "blow-by", that is, passing of fuel injected to the intake passage 4 from the intake ports 3 to the exhaust ports 32 without burning, can be prevented from occurring.

In addition, when the intake valves 37 are closed at later timing and thereby the overlapping term is relatively short, a crank angle A2 starting at a piston reaching TDC and terminating at the exhaust valves 38 being closed is greater than a crank angle A1 starting at the intake valves 37 being open and terminating at a piston ascending to TDC, namely, in the overlapping term, a period of time of a stroke in which the piston descends from TDC is longer than a period of time in which the piston ascends to TDC. Thus, fuel provided to the intake ports 3 tends to flow into a combustion chamber during a stroke in which the piston descends from TDC, whereby the "blow-by" can efficiently be reduced.

Simultaneously, since the intake valves 37 are closed at later timing than usual, substantial compression ratio of intake air in a combustion chamber can be reduced. Furthermore, since intake air is supplied to the engine 1 after the intake air is compressed in the supercharger 10 and cooled in the intercooler 21, an amount of intake air charged by the supercharger 10 can be increased and the compression ratio of intake air can be reduced to decrease the temperature of the compressed intake air, whereby anti-knocking property can be enhanced. It should be noted that when the intake valves 37 are to be closed at later timing, the supercharger 10 receives a high load to increase pressure at supercharging resulting that the temperature of discharged intake air increases, but that since these occurs at low speed of the engine 1, the temperature of discharged intake air never reaches a critical point.

The mask portions 52 are formed around an opening of the exhaust ports 32. As earlier mentioned, when the overlapping term is relatively short (L1), the overlapping term starts with the situation that the height h2 of the exhaust valves 38 is lower than the height of the mask portions 52, while when the overlapping term is relatively long (L2), the overlapping term starts with the situation that the height h2 of the exhaust valves 38 is taller than the height H of the mask portions 52. Accordingly, during the overlapping term, since the mask portions 52 overlap the flow of fuel, the "blow-by" can be reduced by the mask portions 52 even if the overlapping term is set to be rather long. Consequently, even when the engine speed is relatively low, the overlapping term can be set to be long to thereby further enhance anti-knocking property of the engine 1.

On the other hand, when the engine speed is relatively high, the sleeve 48 of the intake valve timing varying apparatus 46 is actuated by the actuator 50 to move to the aforementioned one stroke end, whereby the overlapping term is set to be relatively long and the intake valves 37 are closed at usual timing as illustrated with a broken line A in FIG. 1. Thus, the relatively long overlapping term causes that the density of gas residual in a combustion chamber can be reduced by fresh intake air. In addition, since the supercharger 10 is a mechanical supercharger which can obtain pressure at supercharging higher than pressure of exhaust gas, such a high pressure at supercharging can scavenge residual gas in a combustion chamber to further reduce the density of residual gas and thereby the temperature of intake air is reduced resulting that knocking can be further reduced.

Furthermore, the decrease of residual gas in a combustion chamber allows an amount of charged intake air to increase resulting with the improvement of output power of the engine 1. In addition, intake air can be charged at lower pressure at supercharging. This reduces load of the supercharger 10, and also reduces the temperature of discharged intake air and maintains the temperature under a critical point.

Though a mechanical supercharger is used as the supercharger 10 in this embodiment, it may be replaced with a turbocharger driven by exhaust gas energy. A turbocharger can obtain the same advantageous effects as a mechanical supercharger.

In addition, the mask portions 52 may be formed around the intake ports 3 instead of the exhaust ports 32 or around both the intake and exhaust ports 3, 32.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A controller and supercharged engine combination comprising:

an intake valve for controlling an introduction of intake air to an engine by opening and closing at a predetermined timing;

an exhaust valve for controlling a discharge of exhaust gas from the engine by opening and closing at a predetermined timing;

a supercharger, located upstream of said intake valve, for supercharging intake air;

an intercooler for cooling the intake air discharged from said supercharger;

valve timing varying means for varying valve timings of the intake and exhaust valves so that an overlapping term in which both intake and exhaust valves open is longer when an engine speed is relatively high than when the engine speed is relatively low;

controlling means for controlling said valve timing varying means so that when the overlapping term is relatively short at a relatively low speed of the engine, the intake valves close at a timing later than a timing at which the intake valves close when the overlapping term is relatively long at relatively high speed of the engine; and mask portions formed on an exhaust port extended towards a combustion chamber at an intake port side of said exhaust valve so that when the overlapping term is relatively short, the overlapping term starts with the situation that valve lift of the exhaust valve is lower than a height of said mask portions, while when the overlapping term is relatively long, the overlapping term starts with the situation that valve lift of the exhaust valve is higher than the height of said mask portions.

2. A controller and supercharged engine combination comprising:

an intake valve for controlling an introduction of intake air to an engine by opening and closing at a predetermined timing;

an exhaust valve for controlling a discharge of exhaust gas from the engine by opening and closing at a predetermined timing;

a mechanical supercharger driven by the engine, located upstream of said intake valve, for supercharging intake air;

an intercooler for cooling the intake air discharged from said supercharger;

valve timing varying means for varying valve timings of the intake and exhaust valves so that an overlapping term in which both intake and exhaust valves open is longer when an engine speed is relatively high that when the engine speed is relatively low;

controlling means for controlling said valve timing varying means so that when the overlapping term is relatively short at a relatively low speed of the engine, the intake valves close at a timing later than a timing at which the intake valves close when the overlapping term is relatively long at relatively high speed of the engine; and mask portions formed on an exhaust port extended towards a combustion chamber at an intake port side of said exhaust valve so that when the overlapping term is relatively short, the overlapping term starts with the situation that valve lift of the exhaust valve is lower than a height of said mask portions, while when the overlapping term is relatively long, the overlapping term starts with the situation that valve lift of the exhaust valve is higher than the height of said mask portions.

3. A controller and supercharged engine combination comprising:

an intake valve for controlling an introduction of intake air to an engine by opening and closing at a predetermined timing;

an exhaust valve for Controlling a discharge of exhaust gas from the engine by opening and closing at a predetermined timing;

a supercharger, located upstream of said intake valve, for supercharging intake air;

an intercooler for cooling the intake air discharged from said supercharger;

valve timing varying means for varying valve timings of the intake and exhaust valves so that an overlapping term in which both intake and exhaust valves open is longer when an engine speed is relatively high than when the engine speed is relatively low;

controlling means for controlling said valve timing varying means so that when the overlapping term is relatively short at a relatively low speed of the engine, the intake valves close at a timing later than a timing at which the intake valves close when the overlapping term is relatively long at relatively high speed of the engine, wherein said valve timing varying means is controlled by said controlling means so as to control the overlapping term at low speed of the engine so that a period of time of a stroke in which a piston descends from TDC is longer than a period of time of a stroke in which the piston ascends to TDC; and mask portions formed on an exhaust port extended towards a combustion chamber at an intake port side of said exhaust valve so that when the overlapping term is relatively short, the overlapping term starts with the situation that valve lift of the exhaust valve is lower than a height of said mask portions, while when the overlapping term is relatively long, the overlapping term starts with the situation that valve lift of the exhaust valve is higher than the height of said mask portions.

4. A controller and supercharged engine combination comprising:

an intake valve for controlling an introduction of intake air to an engine by opening and closing at a predetermined timing;

an exhaust valve for controlling a discharge of exhaust gas from the engine by opening and closing at a predetermined timing;

a mechanical supercharger driven by the engine, located upstream of said intake valve, for supercharging intake air;

an intercooler for cooling the intake air discharged from said supercharger;

valve timing varying means for varying valve timings of the intake and exhaust valves so that an overlapping term in which both intake and exhaust valves open is longer when an engine speed is relatively high than when the engine speed is relatively low;

controlling means for controlling said valve timing varying means so that when the overlapping term is relatively short at a relatively low speed of the engine, the intake valves close at a timing later than a timing at which the intake valves close when the overlapping term is relatively long at relatively high speed of the engine, wherein said valve timing varying means is controlled by said controlling means so as to control the overlapping term at low speed of the engine so that a period of time of a stroke in which a piston descends from TDC is longer than a period of time of a stroke in which the piston ascends to TDC; and mask portions formed on an exhaust port extended towards a combustion chamber at an intake port side of said exhaust valve so that when the overlapping term is relatively short, the overlapping term starts with the situation that valve lift of the exhaust valve is lower than a height of said mask portions, while when the overlapping term is relatively long, the overlapping term starts with the situation that valve lift of the exhaust valve is higher than the height of said mask portions.

5. An internal combustion engine comprising:

an intake valve, an exhaust valve, and exhaust valve mask portions formed towards a combustion chamber to be higher than other portions at least at a part of peripheral edges of openings of at least one of the intake and exhaust valves, an overlapping term, in which both the intake and exhaust valves open, starting when valve lift of the exhaust valve is lower than the height of said mask portions.

6. The internal combustion engine in accordance with claim 5, further comprising a supercharger for supercharging intake air.

7. The internal combustion engine in accordance with claim 5, wherein a period of a stroke in which a piston descends from TDC is longer than a period of time of a piston in which the piston ascends to TDC.

8. A controller for an internal combustion engine comprising:
   an intake valve,
   an exhaust valve,
   valve timing varying means for varying valve timing so that an overlapping term in which both of the intake and exhaust valves open is shorter in a predetermined engine operating condition than not in the predetermined engine operating condition, and
   mask portions formed toward a combustion chamber to be higher than other portions at least at a part of peripheral edges of openings of at least one of the intake and exhaust valves, whereby when the overlapping term is relatively short, the overlapping term starts with the situation that valve lift of the exhaust valve is lower than the height of said mask portions, while when the overlapping term is relatively long, the overlapping term starts with the situation that valve lift of the exhaust valve is higher than the height of said mask portions.

9. The controller in accordance with claim 8, further comprising a supercharger for supercharging intake air.

10. The controller in accordance with claim 8, further comprising controlling means for controlling said valve timing varying means so that when the overlapping term is relatively short, the intake valve closes at a timing later than a timing at which the intake valve closes when the overlapping term is relatively long.

11. The controller in accordance with claim 9, further comprising controlling means for controlling said valve timing varying means so that when the overlapping term is relatively short, the intake valve closes at a timing later than a timing at which the intake valve closes when the overlapping term is relatively long.

* * * * *